Sept. 15, 1959  N. M. KIRK  2,904,300
HOOK FOR TRANSPORTING MEAT IN VEHICLES
Filed March 15, 1955
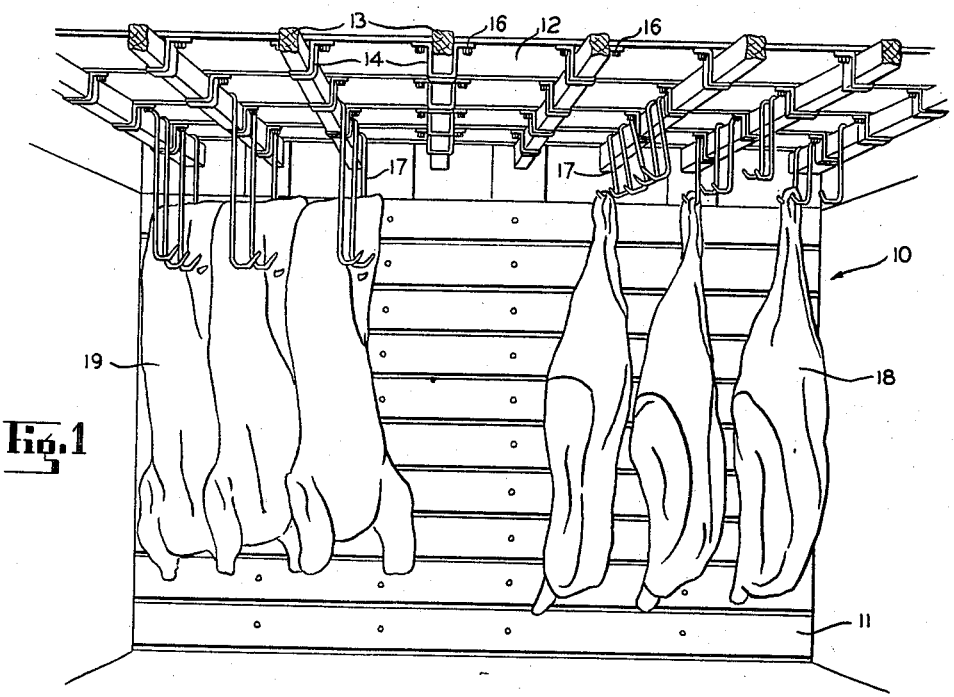
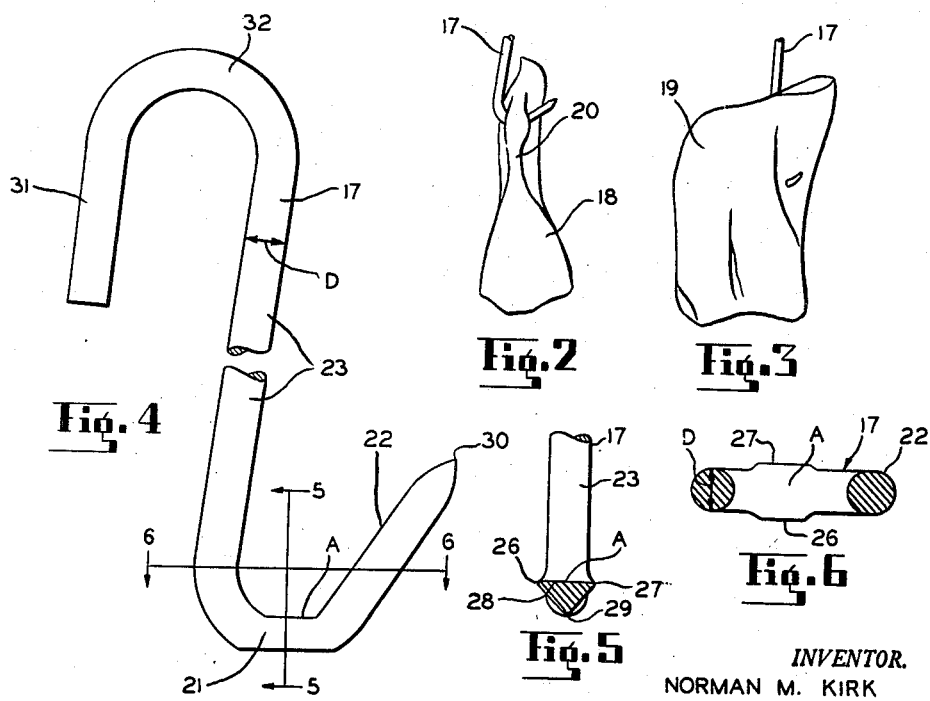
INVENTOR.
NORMAN M. KIRK
BY
ATTORNEYS United States Patent Office 2,904,300
Patented Sept. 15, 1959

2,904,300

HOOK FOR TRANSPORTING MEAT IN VEHICLES

Norman M. Kirk, Chicago, Ill.

Application March 15, 1955, Serial No. 494,503

1 Claim. (Cl. 248—340)

This invention relates generally to meat suspension means and more particularly to an improved meat hook and method of making same for suspending meat in refrigerated enclosures and particularly in vehicular enclosures adapted for the transportation of meat.

As is well known, meat is frequently required to be transported from place to place or stored in enclosures wherein the meat is suspended from a roof construction. For example, in refrigerated vehicular enclosures such as a refrigerated railway car or in a refrigerated truck, meat is frequently hung on round bar steel hooks suspended from rails running crosswise in the vehicular enclosure.

In the case of beef, the hindquarters are suspended by the gam cord of the animal, while the forequarters are suspended preferably at a location between the fourth and fifth rib of the animal.

In recent years, there have been great improvements in breeding and feeding of beef animals and, accordingly, prime grades of beef are now obtained through the slaughtering of animals several years younger than in former practice. As a result, a particularly severe problem has been presented in the successful transportation of such meat in vehicular enclosures because the immature softer rib bones and the heavier quarters of contemporary beef animals are frequently torn by the steel hooks which have been heretofore provided. It will be understood that when a steel hook tears through the rib and flesh of a forequarter, for example, the entire forequarter will eventually be dropped upon the floor of the enclosure.

When an entire enclosure is loaded, the quarters are lined up side by side so that each adjoining quarter engages one another. When one quarter of beef falls to the floor, however, because of the tearing action of a hook, the extra space permits the adjoining quarters to start swinging, particularly in vehicular enclosures whereupon a chain reaction will be caused throughout the remaining load in the refrigerated enclosure. As a consequence, additional quarters gain swaying momentum, which in turn, causes more "down beef."

This loss of prime beef to the trade and the resultant claims which are made against the carrier have been one of the greatest handicaps in the transportation of hung meat by rail and by truck.

According to the principles of the present invention, a meat hook is provided by bending the end of a round bar to provide a bight portion with a prong on one side of the bight portion and a shank on the other side thereof.

The bight portion of the hook is squeezed to provide a generally triangular configuration in cross section, with one leg of the triangle disposed generally horizontally at the inside of the bight portion, thereby to form a bearing surface of greatly increased area. This increased bearing area is provided without sacrificing suspension strength of the hook because the triangular shape insures an adequate distribution of metal at the bight portion to resist vertical forces imposed thereupon.

The formation of a meat hook according to the principles of the present invention has other advantages in that the hook construction is simple and smooth, thereby precluding the possibility of retaining flesh on the hooks from previous shipments and greatly facilitating sterilization of the hooks such as might be required to pass health inspections before further use of the hooks.

It is an object of the present invention, therefore, to provide improved meat suspension means, particularly, as employed in refrigerated enclosures such as are adapted to be vehicularly transported.

Another object of the present invention is to provide an improved meat hook which will minimize tearing of flesh.

Yet another object of the present invention is to provide a meat hook which will more efficiently carry heavier weighted quarters even though the rib bones are softer and more immature than heretofore provided.

Another object of the present invention is to provide an improved meat hook which has no undesirable projections and which may be easily and speedily sterilized.

Another object of the present invention is to provide a method of making a meat hook whereby a bight portion affording an increased bearing area is provided.

Many other advantages and additional objects of the present invention will become manifest to those versed in the art upon making reference to the detailed description which follows and the accompanying sheet of drawings in which a preferred structural embodiment of a meat hook incorporating the principles of the present invention is shown by way of illustrative example.

On the drawings:

Figure 1 is a partial perspective view of a vehicular enclosure such as a railway car adapted for carrying meat and incorporating the suspension means of the present invention.

Figure 2 is a fragmentary view illustrating one of the hooks of the present invention supporting a hind quarter of a beef animal by the gam cord.

Figure 3 is a fragmentary view illustrating in greater detail the provision of a hook according to the present invention supporting the forequarter of a beef animal.

Figure 4 is an enlarged elevational view of a meat hook incorporating the principles of the present invention.

Figure 5 is a fragmentary cross-sectional view taken on line V—V of Figure 4, and Figure 6 is a fragmentary cross-sectional taken substantially on a line VI—VI of Figure 4.

As shown on the drawings:

A refrigerated enclosure is indicated at 10 and in the illustrative embodiment of this disclosure the enclosure 10 constitutes a refrigerated railway car although it will be understood that the principles of the present invention are equally applicable to other forms of vehicles such as trucks and the like.

The enclosure 10 includes side walls 11 and a roof or ceiling 12. A plurality of spaced apart beef rails 13 are suspended from the ceiling or roof 12 by means of a plurality of brackets indicated at 14 and retained by fasteners indicated at 16. Meat is suspended from the beef rails 13 by a plurality of steel hooks.

The hooks of the present invention are indicated by the single reference numeral 17, although, it will be understood that the length of hooks preferably differ since short hooks are preferred for hanging hind quarters indicated at 18 and long hooks are preferred for hanging forequarters indicated at 19.

As shown in Figure 2, a hind quarter 18 is hung by the gam cord 20 of an animal whereas forequarters such as the forequarter 19 are suspended on the longer type hook 17 between the fourth and the fifth rib of the animal as is indicated in Figure 3.

According to the principles of the present invention, the hook 17 comprises a steel round bar which is bent to provide a bight portion 21 with a prong 22 on one side of the bight portion 21 and a shank 23 on the other side of the bight portion 21.

It is contemplated according to the principles of the present invention that a greatly increased bearing area be provided to minimize tearing action of the hook with respect to the fleshy fibers of the meat suspended from the hooks. To effect that end, the bight portion 21 is particularly characterized by a special structural configuration. That configuration is achieved by squeezing the bight portion of the hook 17 to provide a generally triangular configuration in cross section with one leg of the triangle disposed generally horizontally with respect to the normal plane of the hook when it is suspended and in use. Thus, the flat bearing surface provided by the leg and indicated generally at A in the drawings is located at the inside of the bight portion 21 and forms a bearing surface of greatly increased area over the normal bearing area of the round bar shape of the hook prior to working of the bight portion 21 in compression.

Referring more particularly to Figures 5 and 6, it will be noted that the surface or area A extends between opposite edge portions 26 and 27 which are spaced apart from one another by a distance greater than the diameter D of the hook 17.

Moreover, since the leg of the triangle (in cross section) shown in Figure 5 at 28 is generally horizontally disposed, the apex of the triangle indicated at 29 is in dependent relation, thereby insuring an adequate supply of metal at the bight portion to resist vertical forces. Thus, according to the present invention, the bearing surface A is maximized without sacrificing any of the strength characteristics of the steel hook.

As will be clear from an inspection Figure 4, the prong 22 is so shaped or sharpened as to provide a point 30 to facilitate penetration of meat fibers. Moreover, the prong 22 is angularly offset with respect to the bight portion 21 and expends a sufficient distance in an angularly upward direction to form an adequate jaw for supporting the meat therein.

The shank 23 is also angularly offset with respect to the bight portion 21 and terminates in a reversely turned leg 31 which lies in parallel spaced relation to the shank 23 and forms an eye by means of which the hook 17 may be suspended from a beef rail 13. The leg 31 is joined to the shank 17 by a curved bight portion indicated at 32.

Since the hook construction is so simple and smooth, there will be no retention of flesh from previous shipments, thereby facilitating speedy and easy sterilization.

Furthermore, since the greatly increased bearing area A is far less likely to tear through the flesh of the beef suspended on the hook, quarters of beef having immature softer rib bones and heavier weights may be safely carried and the problem of "down beef" is minimized.

Although various minor modifications might be suggested by those versed in art, it should be understood that I wish to embody within the scope of the patent warranted hereon all such modifications as reasonably and properly come within the scope of my contribution to the art.

I claim as my invention:

A meat hook for suspending a cut of meat on the rail of a refrigerated enclosure comprising, a bar form member of normally uniform circular cross-sectional configuration throughout its length and having a vertically disposed shank portion with integral prong and eye means formed on opposite ends thereof, respectively, said prong means comprising a horizontally offset bight portion extending outwardly from said shank portion in one direction and terminating in a short leg spaced from said shank portion and extending upwardly and outwardly from said bight portion at an angle relative to the vertical, said short leg having a point formed on the free end extremity thereof for penetrating meat fibers, said bight portion being preformed away from said circular cross-sectional configuration to a generally triangular cross-sectional shape with one leg of the triangle disposed generally horizontally at the inside of the bight portion to form a broad, flat meat supporting surface of greater cross-sectional area than any cross-sectional area of the bar parallel to the corresponding plane of the surface, thereby to minimize tearing of meat fibers supported on said hook at said bight portion, said eye means comprising a horizontally offset bight portion extending outwardly from said shank portion in an opposite direction and terminating in a leg spaced from and parallel to said shank portion for cooperation with a support rail.

References Cited in the file of this patent

UNITED STATES PATENTS

| | | |
|---|---|---|
| 67,934 | Willson | Aug. 20, 1867 |
| 829,239 | Thompson et al. | Aug. 21, 1906 |
| 1,189,966 | Kellogg | July 4, 1916 |
| 2,470,878 | Tate | May 24, 1949 |
| 2,520,561 | Peckinpaugh | Aug. 29, 1950 |
| 2,568,027 | Rachlin | Sept. 18, 1951 |
| 2,590,533 | Hamer | Mar. 25, 1952 |